United States Patent [19]

DeAngelis et al.

[11] 4,119,428
[45] Oct. 10, 1978

[54] APPARATUS FOR BENDING GLASS SHEETS

[75] Inventors: Willie G. DeAngelis, Brackenridge; Edward R. Crowe, Arnold, both of Pa.

[73] Assignee: PPG Industries, Inc., Pittsburgh, Pa.

[21] Appl. No.: 827,523

[22] Filed: Aug. 25, 1977

Related U.S. Application Data

[63] Continuation-in-part of Ser. No. 716,416, Aug. 23, 1976, abandoned.

[51] Int. Cl.² .......................................... C03B 23/02
[52] U.S. Cl. ........................................ 65/287; 65/107; 65/273
[58] Field of Search ................ 65/107, 273, 287, 289, 65/286, 288

[56] References Cited

U.S. PATENT DOCUMENTS

| Re. 27,634 | 5/1973 | Cypher | 65/104 |
|---|---|---|---|
| 1,999,558 | 4/1935 | Black | 65/289 |
| 2,021,180 | 11/1935 | Galey | 65/287 |
| 2,297,315 | 9/1942 | Owen | 65/287 |
| 2,327,883 | 8/1943 | Galey | 65/287 |
| 2,554,572 | 5/1951 | Jendrisak | 65/289 |
| 2,695,476 | 11/1954 | Jendrisak | 65/290 |
| 2,720,729 | 10/1955 | Rugg | 65/288 |
| 2,744,359 | 5/1956 | Jendrisak | 65/107 |
| 2,746,209 | 5/1956 | Walters | 65/288 |
| 2,766,555 | 10/1956 | Jendrisak et al. | 65/103 |
| 2,798,338 | 7/1957 | Jendrisak | 65/290 |
| 3,023,543 | 3/1962 | Laine et al. | 65/291 |
| 3,233,996 | 2/1966 | Cox et al. | 65/107 |
| 3,248,202 | 4/1966 | Corsi | 65/291 |
| 3,265,489 | 8/1966 | Garbin | 65/291 |
| 3,278,288 | 10/1966 | Leflet, Jr. | 65/104 |
| 3,408,173 | 10/1968 | Leflet, Jr. | 65/107 |
| 3,484,226 | 12/1969 | Golightly | 65/291 |
| 3,511,628 | 5/1970 | Adamson | 65/107 |

FOREIGN PATENT DOCUMENTS

1,174,962  11/1958  France .................................... 65/286

*Primary Examiner*—Arthur D. Kellogg
*Attorney, Agent, or Firm*—Dennis G. Millman; Edward I. Mates

[57] ABSTRACT

A gravity sag bending mold of the outline type for bending glass sheets is provided with the following improvements: (1) A plurality of rod-like glass supporting members are affixed outwardly and slightly above the shaping surfaces of the bending mold to reduce glass slippage and mold marking. (2) The bending mold is comprised of a plurality of rigid shaping rail sections, each independently mounted so that the outline dimensions can be adjusted slightly. (3) The bending mold is tilted downwardly in the direction of travel a maximum of 5 degrees to reduce glass slippage.

6 Claims, 7 Drawing Figures

APPARATUS FOR BENDING GLASS SHEETS

RELATED APPLICATION

This application is a continuation-in-part of Application Ser. No. 716,416, filed Aug. 23, 1976, now abandoned.

BACKGROUND OF THE INVENTION

1. Field of the Invention

This invention relates to bending glass sheets, and particularly relates to bending glass sheets by the gravity sag technique into shallow bends required for certain windshields. This invention more particularly concerns bending pairs of glass sheets simultaneously to a shape of gentle curvature for subsequent lamination to form curved, laminated windshields of a particular curved shape, but which may require the shaping of glass sheets of slightly different outline contour to said particular curved shape without requiring a change of molds for the shaping operation.

Laminated, curved glass windshields have been produced by gravity sag bending on outline bending molds of rigid metal rail construction that have had the metal rail construction reinforced either by cross bracing within the outline of the mold or by rigidly connecting the outline mold to an exterior bracing frame or a combination of the two reinforcement techniques. Glass sheets have also been bent on continuous outline molds that are adjustable in shape by connecting relatively flexible glass supporting members to a rigid reinforcing frame. In bending glass sheets to relatively deep bends by the gravity sag method, it has been customary to use outline molds comprising rigid shaping rails that include one or more shaping rails pivoted to other shaping rails rigidly connected to a mold supporting frame. Some molds of this type have shaping rails that are replaceable to provide different shapes without requiring replacement of the entire mold.

To the best of our knowledge, the prior art has not provided an outline bending mold of the gravity sag type having a permanent shaping surface that conforms to the shape desired for the glass sheets after bending and is likewise capable of micrometer adjustment in outline size only without changing the curvature provided by the upward facing outline shaping surface of the bending mold. Such a mold would be useful during the course of an automobile model year when the outline contour required of the glass windshield must be changed slightly in one or both dimensions without changing the shape of the bent glass so that a glass sheet of a particular shape but of a slightly different outline contour conforming to a change in styling may be shaped on the same complement of outline molds as the glass sheets conforming to the original contour. Frequently, the adjusted contour required for the glass is sufficiently smaller than the original contour so that the bent glass sheet cannot be supported on the bending mold as developed for the original pattern even though the shape required for the glass is unchanged. Also, in case the opening for the windshield is increased without changing the shape thereof, a larger glass sheet supported on a mold of unchanged size would tend to develop a reverse lip around its marginal portion that lies beyond the portion of shaped glass sheet that sags to conform to the shaping rail. Such a reverse lip makes it difficult to install the shaped windshield in a shaped frame to receive the windshield.

In addition, since laminated windshields for compact cars which consume less gasoline are smaller and comprise thinner glass sheets than has been the case previously, some losses have been experienced because of glass sheets sliding relative to the mold shaping surface when they are accelerated rapidly from a position of rest where they are loaded onto the mold to a relatively high speed at which they are conveyed through a tunnel-like bending lehr where the glass is exposed to sufficient heat to cause it to sag to conform to the outline shaping surface of the mold.

2. Description of the Prior Art

U.S. Pat. No. 1,999,558 to Black discloses an outline mold comprising a pair of shaped bars that support the longitudinal side edges of the bent glass interconnected rigidly to transverse end rods to form a continuous mold shaping surface that supports the bent glass sheet and edge engaging members that engage the longitudinal extremities of the glass and that pivot to follow the glass extremities as the glass sags into engagement with the curved bars. The force applied against the engaged longitudinal extremities of the glass mars the longitudinal extremities of the glass.

U.S. Pat. No. 2,297,315 to Owen discloses a flexible shaping mold of the outline gravity sag type that is adjustable both as to shape and outline and is connected through adjustment members to a peripheral frame of rigid construction. The shaping member is either a continuous flexible band such as a helically coiled spring or a continuous notched band having notches provided along its alternate edges to impart flexibility to the shape of the mold as distinguished from its contour. Such bands are capable of assuming various curvatures and outlines when adjusted. While this patent states that the mold is sufficiently strong to withstand the weight of glass and is flexible only under the application of a greater force, the fact that the molds comprise endless shaping rails makes it difficult to avoid stressing the mold into distortion to compensate for distortion in outline at locations other than the locations where localized stress is applied to alter the mold outline contour.

U.S. Pat. No. 2,720,729 to Rugg; U.S. Pat. No. 2,798,338 to Jendrisak; U.S. Pat. No. 3,023,543 to Laine and Hagedorn; U.S. Pat. No. 3,265,489 to Garbin; U.S. Pat. No. 3,278,288 to Leflet; U.S. Pat. No. 3,408,173 to Leflet; and U.S. Pat. No. Re 27,634 to Cypher all disclose outline molds that have little or no interior bracing and are braced by rigid connections to a rigid outer member.

U.S. Pat. No. 3,484,226 to Golightly discloses an outline mold comprising notched shaping rails whose notches interfit with one another to provide different outlines for supporting glass sheets of different sizes to be bent. The differences in dimensions of shapes that can be supported on the Golightly molds are of finite variation depending upon the thickness of the rails and the width and spacing between notches.

U.S. Pat. No. 2,766,555 to Jendrisak and Carson discloses supporting outline ring molds in a tilted plane about an axis extending transverse to the path of mold movement through a bending lehr having a hotter temperature near the roof and a lower temperature near the floor of the lehr to help shape glass sheets to a non-uniform shape.

U.S. Pat. No. 3,233,996 to Cox, McKelvey and Reese discloses outline bending molds for shaping glass sheets to a complex curvature wherein during a bending operation, the molds are tilted about an axis extending transverse to the path of movement the glass sheet takes through a bending lehr having a vertical temperature gradient similar to that of the Jendrisak and Carson patent. Both of these latter patents show supporting glass sheets obliquely in order to enhance non-uniformity of bend.

SUMMARY OF THE INVENTION

It is an object of the present invention to provide a glass sheet bending mold that has rigid shaping rails that retain the shape desired for the glass sheet and yet are capable of conforming to shapes of slightly different outlines on the order of magnitude that can be expected to change during the course of a model year.

It is another object of the present invention to provide glass shaping molds of the gravity sag type that together with the reinforcement structure have a minimum of mass so that a minimum amount of energy is consumed in heating each mold when a pair of glass sheets is heated to the deformation temperature of the glass to cause the glass to conform to the upper edge surface of the mold by the gravity sag bending technique.

It is still another object of the present invention to avoid slippage of glass sheets relative to the direction of mold movement when the mold is accelerated rapidly into a bending lehr after the glass sheets are mounted on the mold for bending, yet permitting the glass sheets to slide in a direction transverse to said mold movement as they sag when heated.

The present invention relates to a glass sheet bending mold of adjustable outline defining a rigid shape of shallow curvature and a method of bending glass sheets supported on said mold.

A preferred embodiment comprises a mold consisting essentially of a pair of end shaping rails having transverse connecting portions turned to form inner end portions and a pair of longitudinally extending side shaping rails whose longitudinal ends are adjacent to and closely spaced from the longitudinal inner ends of the end shaping rails. The shaping rails are of solid construction and are rigid in their longitudinal dimensions and in their transverse vertical dimensions so that they define an outline shaping surface of permanent curvature. A rigid outline frame is provided to reinforce the rigidity of the shaping rails and means is provided to adjust the position horizontally and transversely of longitudinally spaced portions of each shaping rail so as to change the contour of the outline mold by micrometer adjustment without distorting the longitudinal dimensions and transverse vertical dimensions of the shaping rails.

A pair of flat glass supporting members is attached longitudinally outward and slightly upward of the transverse end portions of the end shaping rails. The latter members are elongated in the transverse dimension of the mold and rounded in the longitudinal dimension of the mold to provide a relatively large frictional force in the direction of the transverse dimension of the mold and relatively little frictional resistance to the glass sliding in response to the heat sagging thereof toward the shaping surfaces of said side shaping rails.

In the method aspect of this invention, a pair of flat glass sheets is supported on flat glass supporting members in oblique planes at a small downward angle to the horizontal (preferably less than 5°) to provide further resistance to transverse sliding when the mold is accelerated rapidly at a glass loading station for transverse movement through a bending lehr where the glass is primarily heated from overhead heaters arranged to increase the glass temperature in a downstream direction toward a bending area. Since the bending lehr has a vertical temperature gradient from a hotter temperature near the roof and a less hot temperature near the floor, this downward tilt in the forward direction helps reduce a temperature gradient from side to side of the glass that is normally developed when glass sheets are conveyed transversely into zones of progressively increasing temperature while supported horizontally.

These and other advantages will become obvious in the light of a description of a preferred embodiment of the present invention that follows.

BRIEF DESCRIPTION OF THE DRAWINGS

In the drawings which form part of the description of an illustrative embodiment of the present invention, and wherein like reference numbers refer to like structural elements.

DESCRIPTION OF THE PREFERRED EMBODIMENT

Figure 1:
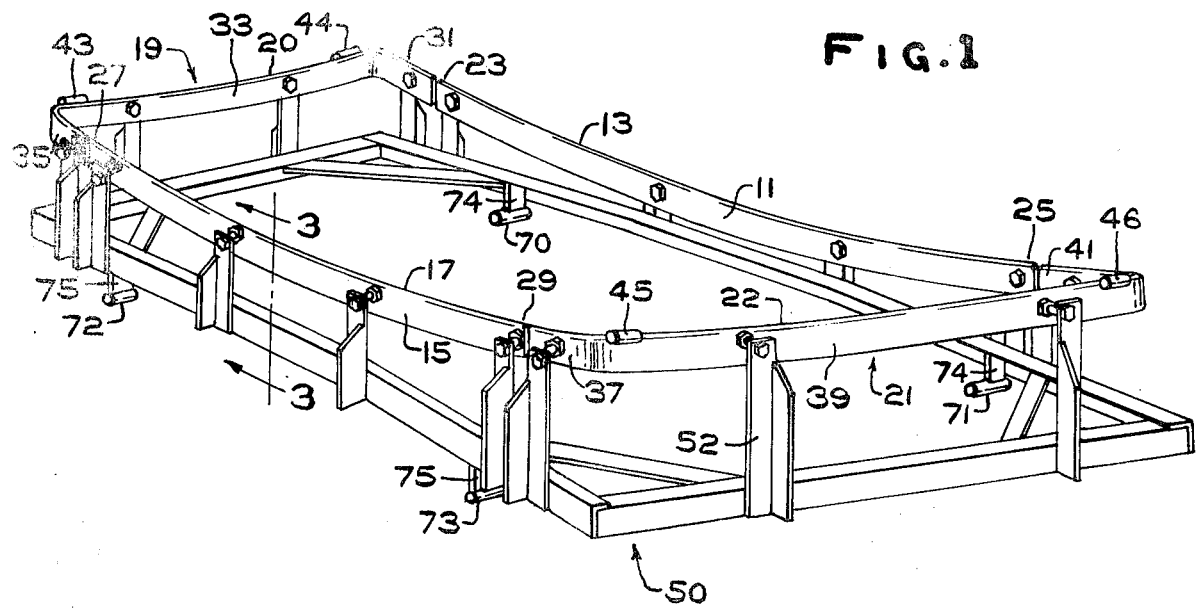
FIG. 1 is a perspective view of a bending mold conforming to the present invention.
Figure 2:
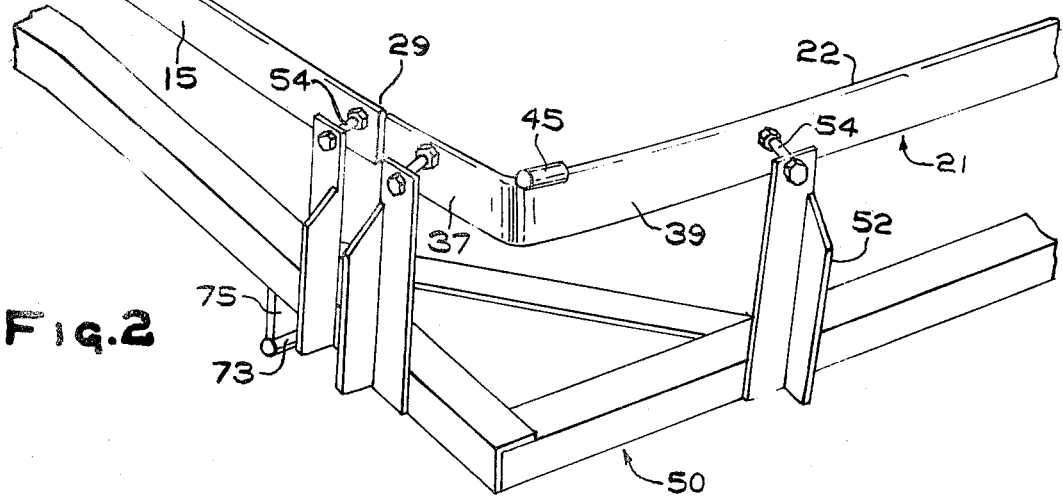
FIG. 2 is an enlarged perspective view of a corner portion of the mold of FIG. 1.
Figure 3:
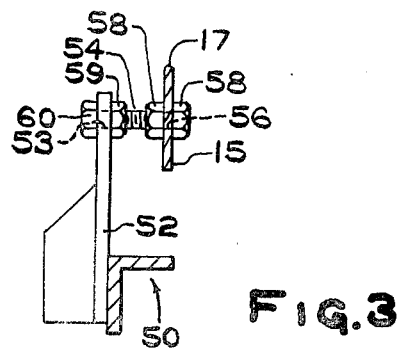
FIG. 3 is a sectional view taken along the lines 3—3 of FIG. 1.

The drawings disclose a preferred embodiment of an outline bending mold for bending glass sheets for a gently curved windshield approximately 65 inches (165 centimeters) long and 28 inches (71 centimeters) wide at its transverse center line and composed of two glass sheets, each approximately 100 mils (2.5 millimeters) thick. According to the present invention, the bending mold comprises a front side, longitudinally extending shaping rail 11 having an upper edge surface 13 shaped to conform to the side edge portion of the glass sheets that are ultimately mounted as the upper edge of a laminated windshield in an automobile windshield frame. The mold also includes a trailing side, longitudinally extending shaping rail 15 having an upper edge surface 17 shaped to conform to the shape desired for the opposite side edge of glass sheets ultimately mounted as the bottom edge of the windshield when installed in the automobile frame. In addition to the longitudinally extending shaping rails 11 and 15, the mold includes an end shaping rail 19 having an upper edge surface 20 and another end shaping rail 21 having an upper edge surface 22.

The front side, longitudinally extending shaping rail 11 has its upper edge surface 13 extending between a longitudinal end portion 23 to a longitudinal end portion 25 at its opposite longitudinal end. Shaping rail 15 has a longitudinal end portion 27 transversely opposed to longitudinal end portion 23 of shaping rail 11 and another longitudinal end portion 29 transversely opposite longitudinal end portion 25 of shaping rail 11 with its upper edge surface 17 extending between longitudinal end portions 27 and 29.

End shaping rail 19 comprises a short, longitudinally extending end portion 31, which turns to form a transversely extending connecting portion 33 extending transversely across one end of the mold and a short, longitudinally extending end portion 35. The longitudinal inner end of end portion 31 is adjacent to but spaced from longitudinal end portion 23 of shaping rail 11, while the longitudinal inner end of end portion 35 is adjacent to but spaced from the longitudinal end portion 27 of shaping rail 15. End shaping rail 21 comprises a short, longitudinally extending end portion 37 having a longitudinal inner end adjacent to the longitudinal end portion 29 of shaping rail 15, which turns to form a transversely extending connecting portion 39, which in turn is turned inward to form a short, longitudinally extending end portion 41. The short, longitudinally extending end portion 41 of end shaping rail 21 has its inner longitudinal end in closely spaced relation to the longitudinal end portion 25 of shaping rail 11. The respective upper edge surfaces 20 and 22 of the end shaping rails 19 and 21 are shaped to provide closely spaced continuations of the portions of the outline shaping surface provided by the upper edge surfaces 13 and 17 and define the longitudinal end portions of the outline shaping surface of the mold.

In the manner thus described, the bending mold provides an outline shaping surface comprising four shaping rails which are disposed in end-to-end relation with their end portions spaced from one another a short distance approximating the distance estimated to be needed for micrometer adjustment of the outline of the mold shaping surface during a model year. The spacing also is sufficient to prevent adjacent ends of the shaping rails from abutting one another when they expand and contract thermally during and between bending cycles.

A pair of glass supporting members 43 and 44 is attached to the transversely extending connecting portion 33 of end shaping rail 19 in a position slightly upward and longitudinally outward of the longitudinal curve defined by the upper edge surface 20 of end shaping rail 19. Additional glass supporting members 45 and 46 are supported in corresponding positions with respect to the upper edge surface 22 of end shaping rail 21.

Each of the shaping rails is of solid continuous construction and is formed of a bar of stainless steel 1½ inches (3.8 centimeters) wide and ⅛ inch (0.3 centimeter) thick disposed edgewise so that each shaping rail is rigid in its longitudinal dimension and in its transverse vertical dimension through its width but is susceptible to some deformation in the direction of its thickness which is its horizontal transverse dimension when the outline mold is subjected to micrometer adjustment of the longitudinal and transverse dimensions of the mold outline according to a technique to be described. In this manner, the outline shaping surface of the mold can be altered in outline while maintaining the shape imparted to the glass substantially unchanged.

In order to assure that the shaping rails are adjustably and rigidly supported, a reinforcing frame 50 is provided together with a plurality of vertically extending support members 52, each rigidly secured at its bottom portion to said reinforcing frame 50 and having an upper edge portion provided with an aperture 53 to receive an adjustment bolt 54. The latter extends through an aperture 53 that is aligned with a corresponding aperture 56 in a shaping rail 11, 15, 19 or 21. The adjustment bolts 54 are externally threaded to receive lock nuts 58 that bear against the opposite major surfaces of the shaping rail and an additional lock nut 59 that bears against the inner surface of the apertured upper edge portion of the vertically extending support member 52. An enlarged head 60 of the adjustment bolt 54 bears against the outer major surface of the vertically extending support member 52.

A plurality of vertically extending support members 52 is provided to adjustably connect each of the shaping rails 11, 15, 19 and 21 to the reinforcing frame 50.

In a particular embodiment of this invention, the reinforcing frame 50 comprises interfitting angle members of stainless steel 3/16 inch (0.5 centimeter) thick and 1¼ inches (3.2 centimeters) wide on each leg of the angle. The vertically extending support members 52 are angles whose legs are 1 inch (2.5 centimeters) wide and ⅛ inch (0.3 centimeter) thick attached to the outer walls of the angles forming the reinforcing frame 50. At least four vertically extending support members 52 are provided for each of the shaping rails, each extending through a corresponding aperture 56. The adjustment bolts are 2 inches long (5 centimeters) and 5/16 inch (0.8 centimeter) in diameter.

A vertically extending support member 52 is provided adjacent each longitudinal extremity of each shaping rail 11, 15, 19 and 21 and the other vertically extending support members 52 are located in substantially equally spaced relation along the length of each of the shaping rails. The longitudinal rail distance between adjacent vertical support members 52 is between about 12 inches (30 centimeters) and about 16 inches (40 centimeters).

Figure 4:
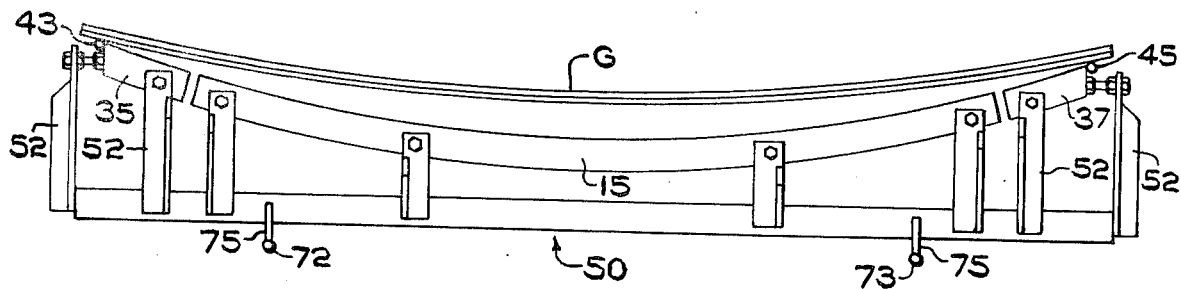
FIG. 4 is a longitudinal elevational view of the bending mold of FIG. 1 showing how it initially supports a pair of glass sheets for bending.
Figure 7:
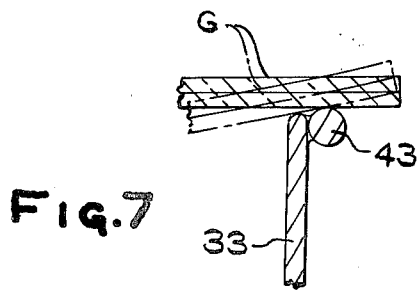
FIG. 7 is a sectional view taken along the lines 7—7 of FIG. 6 illustrating in solid lines the original relation of the glass sheets to a glass sheet supporting member and a portion of the mold shaping surface when the sheets are first mounted on a mold at the beginning of a shaping operation and, in phantom, the relation of the bent glass to that portion of the mold after the glass has been bent.

The flat glass supporting members 43, 44, 45 and 46 in the specific embodiment of the invention are stainless steel rods approximately 1 inch (2.5 centimeters) long and ¼ inch (6 millimeters) in diameter with their longitudinal axes extending transverse to the longitudinally extending shaping rails 11 and 15. The lower sheet of a pair of flat glass sheets G mounted on the flat glass supporting members 43, 44, 45 and 46 has four thin frictional surfaces in the direction of the longitudinal dimension of the mold for the supported glass and four frictional surfaces each about 1 inch (2.5 centimeters) long in the transverse direction of the mold, the direction in which the mold moves through the bending lehr. When initially mounted on the four flat glass supporting members 43, 44, 45 and 46, the glass extends about ½ inch (1.3 centimeters) beyond the lines of support provided by the members 43, 44, 45 and 46, as seen in FIG. 4 and the solid lines in FIG. 7.

The reinforcing frame 50 is provided with four laterally extending pins 70, 71, 72 and 73. The latter are received in a mold supporting carriage which is adapted to support the bending mold for transportation in a transverse direction through a bending lehr.

Figure 6:
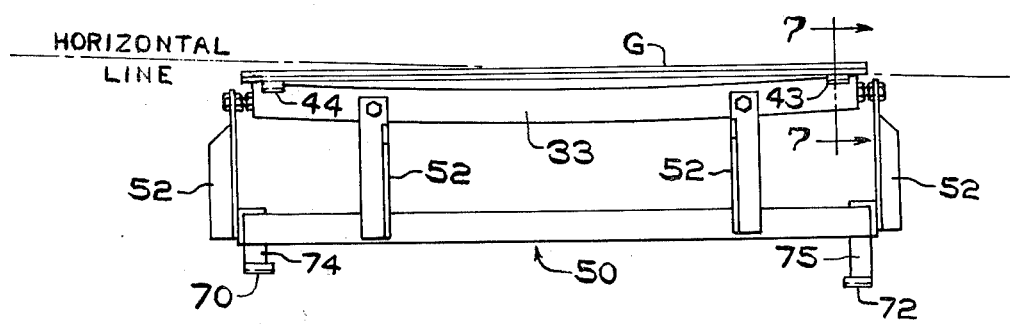
FIG. 6 is a left end view taken at right angles to the view of FIG. 4 showing how a glass sheet is supported at a small oblique angle in a direction transverse to the length of the glass sheet and parallel to the direction of glass movement through a bending lehr.

The pins 70 and 71 disposed beneath the portion of frame 50 disposed adjacent shaping rail 11 are separated from the frame 50 by a greater distance than the pins 72 and 73 disposed adjacent shaping rail 15. While pins 70 and 71 are connected by short equal legs 74 extending from the frame 50, the pins 72 and 73 are connected by longer equal legs 75 extending from frame 50. In this manner, the plane of support provided by the glass support members 43, 44, 45 and 46 forms a slight oblique angle to a horizontal line extending transverse to the mold, as depicted in FIG. 6. The mold is oriented for movement with side shaping rail 11 disposed to the front and side shaping rail 15 disposed to the rear. In this manner, the glass is supported in an oblique support plane that extends obliquely downward in the downstream direction of movement of the mold through a bending lehr. This angle should not exceed 5° and is preferably about 2° to 3°. This obliquity is maintained throughout the bending operation.

Providing an oblique support just described reduces the tendency of the glass sheets to slide in a backward direction when a glass sheet laden mold is rapidly accelerated to move rapidly in a transverse direction. When the glass is supported on the flat glass supporting members 43, 44, 45 and 46 in a flat horizontal plane preparatory to bending, and the mold accelerates rapidly from a rest position at a loading station for rapid movement into the bending lehr, inertia tends to cause the glass sheets to slide backward as the mold moves forward suddenly. This is especially true in the case of bending relatively small and relatively thin glass sheets.

In addition to reducing the incidence of sliding of the glass relative to the mold shaping surface due to inertia, the slight oblique angle formed by supporting the leading side edge of the glass sheet in a lower plane than the plane of support for the trailing edge tends to compensate at least in part for a temperature gradient that normally develops across the width of the glass sheets when the glass is moved transversely in a horizontal disposition through a tunnel-like lehr since the temperature in the lehr increases in the downstream direction of movement and in the vertical direction transverse to the direction of movement until the glass reaches the deformation temperature. Thus, until the glass leaves the lehr, the leading side edge, which is continuously exposed to a higher downstream temperature than the trailing side edge, is also continuously exposed to a slightly lower elevation where the temperature is less than that of the elevation transversed by the trailing side edge to develop this temperature compensation.

Figure 5:
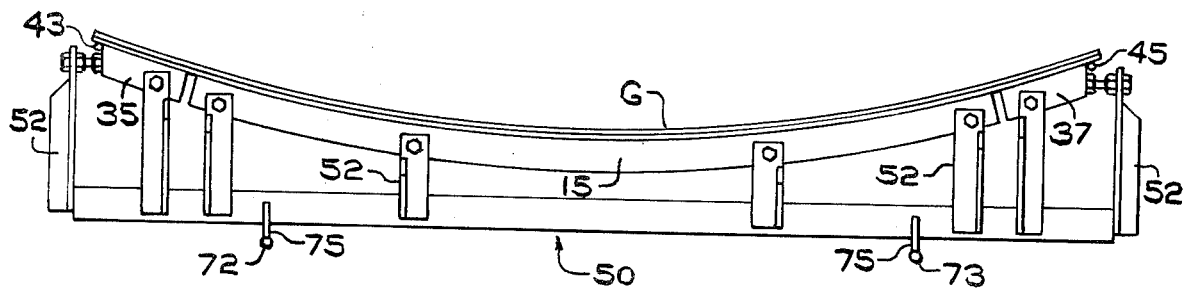
FIG. 5 is a view similar to FIG. 4 showing a pair of glass sheets conforming to the mold after bending.

Having the glass supporting members of rod-like configuration with the rods extending in the direction of glass sheet movement provides a relatively long supporting surface that provides some frictional resistance to the sliding of the bottom glass sheet of a pair of glass sheets to be bent simultaneously relative to the shaping surface of the mold. In addition, since the glass supporting elements are in the form of rods, they make only peripheral contact with the bottom surface of the bottom sheet of the pair to be bent simultaneously. This rod-like construction and orientation provides minimum frictional resistance to the glass sheet sliding in the direction of its length from its initial position depicted in FIG. 4 to its final position depicted in FIG. 5, while providing greater frictional resistance to slippage.

Also, because the rod-like supporting members 43, 44, 45 and 46 initially support a glass sheet at points outside and above the shaping surfaces of the mold, the occurrence of mold marks on the glass can be limited to areas close to the edges of the glass without the danger of the softened sheet slipping off the shaping rails near the end of the bending process. The presence of mold marks in the vision area of a bent glass sheet is usually undesirable. With the glass supporting members of the present invention, the only potentially marring contacts with the glass during the early stages of the bending process are at the outwardly spaced points of contact with the supporting members. As bending progresses, contact with the glass sheet gradually shifts from the supporting members to the shaping rail (see FIG. 7), but only after the sheet has slid inwardly so that contact with the glass remains limited to areas close to the edges of the sheet. Additionally, by the time that the glass sheet comes into contact with the mold rail, the glass sheet has softened and sagged sufficiently to distribute its weight over a relatively wide area of the mold rail, thereby further minimizing the potential for marking. Without the glass supporting members, locating the initial contact points so close to the edges of the glass would leave insufficient overhang after the glass sheet has sagged and slid inwardly to assure that the glass sheet would not drop off the mold. In the particular pattern for which the specific embodiment is used, the glass slides inwardly relative to the supporting members 43, 44, 45 and 46 to reduce the overhang from about ½ inch (1.3 centimeters) for flat glass to about ¼ inch (6 millimeters) for shaped glass.

The shape provided by the upper edges of the shaping rails 11, 15, 19 and 21 is rigidly fixed. The only adjustment provided by the present invention is a micrometer adjustment in the outline contour of mold that results from horizontal displacement of the shaping rails in the direction of their thickness dimension. Furthermore, since the shaping rails are completely separated from one another and provide space for thermal expansion between the adjacent longitudinal extremities thereof during a glass sheet bending operation wherein the mold temperature is subjected to repeated temperature cycles varying by as much as 500° C. (900° F.), there is minimum possibility of the shaping rails warping as a result of the thermal stresses imposed during a heating operation incidental to raising the glass to its deformation temperature that may cause the adjacent spaced ends of the shaping rails from engaging each other to provide a situation likely to develop said thermal stress.

In case the shaping rails are notched alternately at their upper and lower edges, this rigidity of shape could not be maintained so efficiently. Furthermore, if a continuous ring-type mold of helical construction were adjustably attached to a rigid reinforcing frame, the rigidity of the helical construction would be subject to variation that may cause undesired deviations from curvature and/or outline configuration in portions other than those adjusted.

The form of the invention shown and described in this disclosure represents an illustrative preferred embodiment thereof. It is understood that various changes may be made without departing from the gist of the invention as defined in the claimed subject matter that follows, particularly modifications in dimensions of the illustrative embodiment.

We claim:

1. An outline bending mold for shaping glass sheets by the gravity sag method comprising:

a horizontally extending shaping rail substantially enclosing an area and presenting narrow, upwardly facing shaping surfaces corresponding in outline and contour to marginal portions of the bent glass sheet, the rail sections on a first and second opposed sides of the enclosed area having long, concavely arcuate shaping surfaces, and a pair of glass supporting members rigidly affixed outside the enclosed area to the rail section on a third side of the enclosed area, said supporting members being positioned to underlie marginal portions of the lower major surface of a flat glass sheet loaded onto the mold for bending, each of said supporting members having a rounded upper surface extending above the elevation of the adjacent portion of the shaping surface on the rail so as to slidingly support the glass sheet being bent slightly above the adjacent portion of the shaping surface when the glass sheet is flat and to permit the glass sheet to slide into supporting contact with the adjacent portion of the shaping surface after the glass sheet has begun to sag toward the final bent contour.

2. A bending mold as in claim 1 further including a second pair of glass supporting members having rounded upper surfaces affixed to the bending mold outside the enclosed area closely adjacent to the rail section on a fourth side of the enclosed area opposite said third side, the upper extent of each of said rounded upper surfaces being slightly above the elevation of the adjacent portion of the glass shaping surface.

3. The bending mold of claim 2 wherein said glass supporting members each comprise an elongated rod having its axis oriented substantially parallel to the adjacent glass shaping surface.

4. The bending mold of claim 3 wherein the shaping rail sections outline a generally tetragonal shape, and said glass supporting members are each located near the respective junctions of said rail sections.

5. The bending mold of claim 1 wherein each of said rail sections is a separate, rigid member spaced from the adjacent rail sections and independently mounted on a rigid frame member to enable small adjustments in the area enclosed by the rails.

6. The bending mold of claim 1 wherein said shaping rail is affixed to rigid frame means, said frame means having mounting means to engage a horizontally extending conveyor for translating the bending mold in a longitudinal direction parallel to said third rail section, said mounting means being adapted to orient the plane of initial contact of a flat glass sheet with the bending mold at an oblique angle to the horizon up to 5° so as to slope downwardly in the direction of conveyance.

* * * * *